United States Patent [19]

Tomson et al.

[11] Patent Number: 4,457,670

[45] Date of Patent: Jul. 3, 1984

[54] METHODS AND APPARATUS FOR PUMPING COMPRESSIBLE DYNAMOELECTRIC MACHINE LUBRICANT MATERIAL

[75] Inventors: James M. Tomson, Fort Wayne; Richard C. Bohole, New Haven, both of Ind.

[73] Assignee: General Electric Company, Fort Wayne, Ind.

[21] Appl. No.: 946,554

[22] Filed: Sep. 28, 1978

[51] Int. Cl.³ .................................................. F04B 23/10
[52] U.S. Cl. ........................................ 417/53; 417/203
[58] Field of Search .......................... 417/53, 201–203, 417/565

[56] References Cited

U.S. PATENT DOCUMENTS

| | | | |
|---|---|---|---|
| 10,951 | 5/1854 | Miles | 417/565 |
| 793,341 | 6/1905 | Belknap | 417/565 |
| 1,460,300 | 6/1923 | Whitfield | 417/203 |
| 2,378,998 | 6/1945 | Garancher et al. | 417/203 |
| 2,675,759 | 4/1954 | Yarger | 417/415 |
| 2,966,459 | 12/1960 | Abel | 252/14 |
| 3,053,421 | 9/1962 | Abel | 222/250 |
| 3,073,255 | 1/1963 | Gratzmuller | 417/253 |
| 3,221,948 | 12/1965 | Kalist | 222/334 |
| 3,226,801 | 1/1966 | Abel | 29/149.5 |
| 3,268,638 | 8/1966 | Tann | 264/69 |
| 3,609,065 | 9/1971 | Wilson | 417/203 |
| 3,765,575 | 10/1973 | Abel | 222/227 |
| 3,774,721 | 11/1973 | Hollowell | 184/1 D |
| 3,894,956 | 7/1975 | Whitt | 252/14 |

*Primary Examiner*—William L. Freeh
*Attorney, Agent, or Firm*—Ralph E. Krisher, Jr.

[57] ABSTRACT

A preferred method includes pumping extrudable and compressible lubricant storage and wicking material from a supply hopper and into a supply conduit wherein passive valve means are utilized so that material is automatically supplied to a pump mechanism from the hopper and automatically prevented from being urged back into the supply hopper while the material being pumped is being forced out of a pumping chamber. In a most preferred form, the method includes utilizing pressure differentials established by the pump means to control the valving action of a valve or flow control member that is interposed between a pumping chamber and a supply hopper.

Apparatus embodying the invention in one preferred form includes means for rotating an auger as well as stirring rods (if so desired), and means for operating a reciprocating positive displacement pump in a pump chamber which is supplied with material from the continuously rotating auger. The preferred apparatus includes passive valve means which may be in the form of a check valve, a single reed valve, or a double reed valve which is illustrated herein as a double flapper valve. In an embodiment of the invention illustrated herein, a positive pressure is applied to one side of the passive valve means by a feed auger and the other side of the valve means is exposed to an intermittently varying pressure caused by reciprocation of piston means that form part of a positive displacement pump. The alternately high and low pressure gradient across the passive valve means causes material to intermittently flow into a pumping chamber from the supply hopper and then to flow into a discharge conduit rather than being forced back into the hopper.

1 Claim, 4 Drawing Figures

METHODS AND APPARATUS FOR PUMPING COMPRESSIBLE DYNAMOELECTRIC MACHINE LUBRICANT MATERIAL

CROSS REFERENCE TO RELATED APPLICATIONS

This application is generally related to the subject matter of co-pending applications having Ser. Nos. 946,568; 946,569; and 946,553, all of which where filed on the same day as this application and all of which are commonly assigned herewith. The above-referenced application Ser. No. 946,569, now U.S. Pat. No. 4,207,931 is filed in the names of James M. Tomson and Richard C. Bohde, the above-referenced application Ser. No. 946,553, now U.S. Pat. No. 4,207,929 is filed in the name of Larry W. Stoner, and the above-referenced application Ser. No. 946,568, now U.S. Pat. No. 4,207,930 is filed in the name of James M. Tomson. The disclosures of all of these applications are hereby incorportated by reference.

BACKGROUND OF THE INVENTION

The present invention relates generally to methods and apparatus for moving compressible lubricant retaining and wicking material from a supply hopper to a metering head, and more particularly to methods and apparatus for pumping such material along conduit means.

A substantial body of art has been developed pertaining to equipment for pumping and transmitting compressible, flowable lubricating and wicking material utilized in fractional horsepower electric motors. For example, Abel, U.S. Pat. No. 3,053,421 of Sept. 11, 1962 illustrates an injection machine and includes details of a transmission that is utilized both for rotating an auger and stirring arm in a material supply hopper, and a material pumping mechanism. Tann, U.S. Pat. No. 3,268,638 of Aug. 23, 1966 on the other hand simply illustrates an auger feed and a separate pumping mechanism. Still two other patents illustrate complete apparatus including transmission pumps and these patents are Abel, U.S. Pat. No. 3,765,575 of Oct. 16, 1973 and Hollowell Pat. No. 3,774,721 of Nov. 27, 1973. All of these just-mentioned patents are assigned on their face to Permawick Company, Inc. of Detroit, Mich. For a number of years, the Permawick Company (or companies related thereto) have marketed equipment that generally corresponded with the equipment illustrated in the patented literature, including the patents specifically identified hereinabove. A review of the above patents will indicate that relatively complex mechanisms have been utilized heretofore and that apparently much concern has been shown regarding synchronization of parts and also concerning the resolution of problems associated with the use of a combination pump and transmission. Most notably, those problems have involved the contamination of the grease or lubrication in a transmission by the oil contained in the wicking material.

The commercially available equipment mentioned above has been used primarily in conjunction with flowable and extrudable wicking and lubricant storage materials marketed by the Permawick Company which have been made pursuant to, among others, Abel U.S. Pat. No. 2,966,459 of Dec. 27, 1960. That equipment is also usable with the material disclosed in Whitt U.S. Pat. No. 3,894,956 dated July 15, 1975 and commonly assigned herewith. In order to reduce the volume of text presented herein, it is now noted for the record that the just-mentioned Whitt and Abel patents, and the patents referenced hereinabove which are assigned to the Permawick Company are incorporated herein by reference.

A review of the above-referenced patents will indicate that one of the problems in the art is associated with contamination of lubricating grease in a transmission by lubricant oil that drips from the compressible motor lubricant material being pumped. In order to solve this problem, the prior art has attempted to utilize a combination transmission and pump having a relatively complex structure in order to avoid intermingling of the two different lubricant materials present in the equipment. Another problem that has been encountered in actual practice is problems of maintenance and wear associated with the relatively complex gearing and timing mechanisms utilized in the prior art and commercially available equipment.

A review of the above-referenced prior art patents will also show the relative complexity of the combination transmission and pump arrangements and an apparent concern that accurate timing be maintained between a pumping mechanism itself and valve mechanisms that admit material into a pumping chamber.

SUMMARY OF THE INVENTION

Accordingly, it is an object of the present invention to provide new and improved methods and apparatus for pumping extrudable lubricant material from a supply chamber to a pressurized supply conduit which may be interconnected with any suitable metering head.

A more specific object of the present invention is to provide new and improved methods and apparatus for pumping extrudable lubricants whereby precise control and timing of valve means is avoided.

A more specific object of the present invention is to provide new and improved methods and apparatus for pumping compressible lubricant material wherein the admission of material into a pumping chamber by valve means is accomplished automatically as a result of pressure gradients established in the pumping chamber by a pumping mechanism.

Yet another object of the present invention is to provide new and improved methods and apparatus for pumping compressible, extrudable lubricant material utilizing passive valve means which prevent undesired reverse flow of material into a supply hopper and yet reliably and consistently permit the flow of material into a pumping chamber.

Still another object of the present invention is to provide new and improved apparatus for pumping compressible lubricant material wherein the apparatus is easy to maintain, not of complex design, and economical to fabricate.

Another more specific object of the present invention is to provide a new and improved pumping apparratus for compressible lubricant material which can be readily interchanged with existing commercially available equipment either at the time of sale or in the field.

Another even more specific object of the present invention is to provide a new and improved lubricant material pump which avoids cross-contamination of different lubricants exposed to the pump and which is reliable in practice.

In carrying out the above and other objects of the invention, in one preferred form thereof, we provide a method of pumping extrudable and compressible lubricant storage and wicking material for electric motors from a supply hopper and into a supply conduit wherein passive valve means are utilized so that material is automatically supplied to a pump mechanism from the hopper and automatically prevented from being urged back into the supply hopper while the material being pumped is being forced out of a pumping chamber. In a most preferred form, the method includes utilizing pressure differentials established by the pump means to control the valving action of a valve or flow control member that is interposed between a pumping chamber and a supply hopper.

Apparatus embodying the invention in one preferred form includes means for rotating an auger as well as stirring rods (if so desired), and means for operating a reciprocating positive displacement pump in a pump chamber which is supplied with material from the continuously rotating auger. The preferred apparatus includes passive valve means which may be in the form of a check valve, a single reed valve, or a double reed valve which is illustrated herein as a double flapper valve. In an embodiment of the invention illustrated herein, a positive pressure is applied to one side of the passive valve means by a feed auger and the other side of the valve means is exposed to an intermittently varying pressure caused by reciprocation of piston means that form part of a positive displacement pump. The alternately high and low pressure gradient across the passive valve means causes material to intermittently flow into a pumping chamber from the supply hopper and then to flow into a discharge conduit rather than being forced back into the hopper.

The subject matter which is regarded as our invention is particularly pointed out and distinctly claimed in the concluding portion of this specification. The invention itself, however, together with further objects and advantages thereof, may be best understood by reference to the following description taken in conjunction with the accompanying drawings wherein like reference numerals have been utilized to denote like parts.

DESCRIPTION OF THE PREFERRED EMBODIMENTS

With reference now to the drawings, a method is provided in one form of the invention that includes feeding compressible electric motor lubricant material to a pumping chamber with a means for producing a material flow toward a valve means. The method also includes cyclically varying the pressure in the pumping chamber so that alternately positive and negative pressure gradients occur across the valve means. The method further includes relying upon the alternately positive and negative pressure gradients to actuate a passive valve means so that material will flow only in one direction relative to the valve means. When the pressure gradient is positive in the pumping chamber relative to the supply chamber, material is prevented from flowing in a reverse direction into the supply chamber and the material subjected to the high positive pressure within the pumping chamber is discharged into a conduit. However, when the pressure within the pumping chamber becomes negative relative to the pressure in the supply chamber, the valve means permits the flow of material from the supply chamber into the pump chamber.

The preferred method further includes utilizing two separate prime movers in conjunction with the material feeding and pumping process. More specifically, a first prime mover is utilized to drive a feed auger and any stirring rods that might be attached thereto, while another prime mover is utilized for alternately establishing the positive and negative pressure conditions within the pumping chamber.

Figure 1:
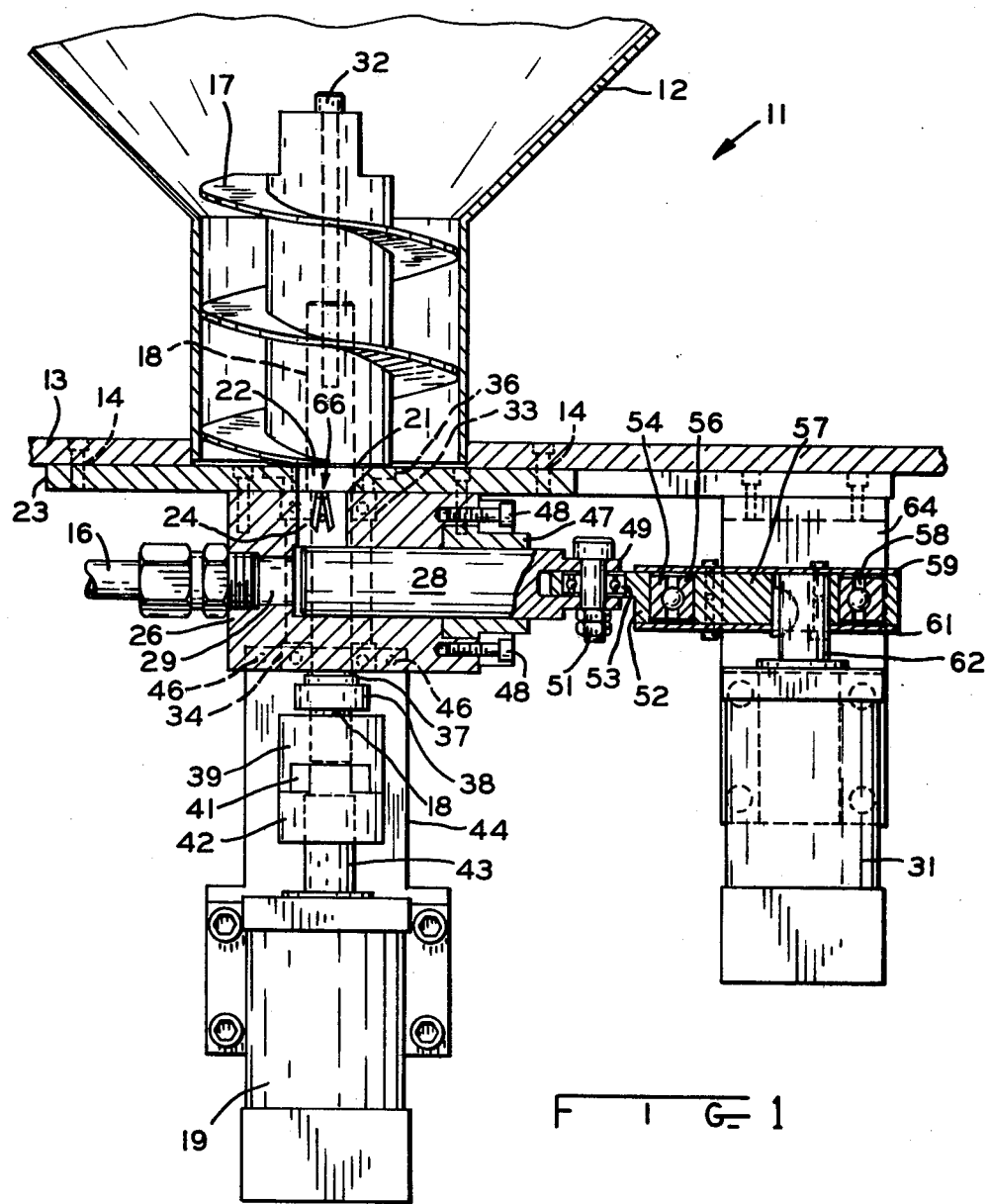
FIG. 1 is a front elevation, with parts removed, parts in section, and parts broken away, of apparatus embodying one form of the invention that may be used to practice the invention in a preferred form thereof.

With specific reference now to FIG. 1 of the drawings, it is initially noted that the apparatus 11 includes a conventional hopper 12. The hopper 12 in fact in a preferred reduction to practice of the invention constituted the hopper that formed part of equipment that was obtained commercially from the Permawick Company that has been identified hereinabove. Moreover, the frame 13 which supported the hopper was actually part of the commercial equipment and no modification was made of the overall frame of the commercial equipment or the hopper 12 which was attached thereto. The commercial equipment, as purchased, included a number of mounting holes 14 which were used to mount a combination transmission pump to the equipment frame as purchased. The combination transmission pump in turn was interconnected with a conduit 16 which also was supplied as part of the machine and which conduit extended to a metering or dispensing head. In order to reduce the present invention to practice, the commercially available combination transmission pump was removed from the frame 13 and disconnected from the conduit 16 and replaced with a pump unit embodying the present invention and which will now be described in more detail.

At the outset, it is noted that the preferred form of carrying out the invention includes the use of an auger 17 mounted on a shaft 18 which is driven by any suitable prime mover but which, in the case of the apparatus 11, has been illustrated as a hydraulic motor 19. An outlet opening 21 at the bottom of the hopper 12 overlies a feed or inlet opening 22 that is formed in a pump mounting plate 23. The inlet opening 22 in turn is in open communication with an inlet throat 24 of a pump body 26. The inlet throat 24 in turn is in open communication with a pumping chamber 27 which is best revealed in FIGS. 3 and 4. Disposed within the pumping chamber 27 is a reciprocating member illustrated as a piston 28 which alternately moves to and fro within the chamber. Because of this action, the material contained within hopper 12 is urged into the pumping chamber and then subsequently urged out of the chamber along an outlet port 29 and subsequently along the discharge conduit 16.

The auger 17 may be continuously driven or may be intermittently driven by interconnecting the control means for the motor 19 with the control means for the motor 31. In an actual reduction to practice of the invention, we have found it sufficient to continuously drive the auger 17 even when the passive valve means in the inlet throat 24 is closed. The auger 17 is mounted to the shaft 18 and drivingly connected therewith by means of a cap screw 32. The shaft 18, in turn, is supported by a pair of bearings 33, 34 which were purchased parts. Although any suitable bearing may be used, the bearings 33 and 34 were MRC #204-FF ball bearings. Leakage of oil from the lubricant material handled in hopper 12 was prevented by using a seal and bearing retainer 34, with a shaft seal being a purchased part identified as a Chicago Rawhide #8660. As will be understood, the shaft 18 extends along a bore formed in the pump body 26 and a spacer 37 and clamp collar 38 cooperate to prevent the auger from rising in the hopper as it forces lubricating material downwardly into the outlet 21 of the hopper. The spacer 37 was used simply as a bearing surface aginst the bottom of pump body 26 whereas the clamp collar was a purchased part. More specifically, the clamp collar 38 was a Holo-Krome "Clamp-Tight" #15022. The lower end of the shaft 18 was fastened to a coupling half 39 which in turn was interconnected with a bronze coupling insert 41 to a lower coupling half 41. The lower coupling half 42 in turn was mounted to the shaft 43 of motor 19. The upper and lower coupling halves as well as the bronze coupling insert were all purchased from Browning and were identified by part numbers #CHJP4 and #JP4 for the coupling halves and insert, respectively. The motor 19 may be an electric motor, or any other kind of prime mover. However, in the illustrated embodiment, the motor 19 was a CHAR-LYNN #103-1019-007 hydraulic motor. As best revealed in FIG. 1, the motor 19 was mounted to a motor mounting plate 44 which was fastened by means of screws 46 to the pump body 26.

Figure 2:
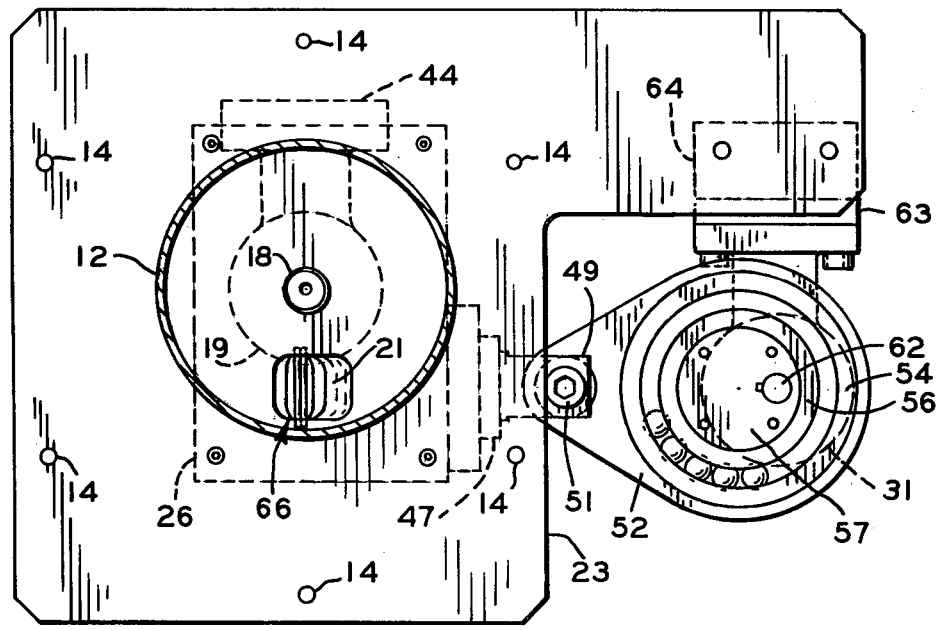
FIG. 2 is a top or plan view of the apparatus shown in FIG. 1, assuming that the structure of FIG. 1 were shown in full, but with some parts removed from FIG. 2 in order to facilitate the description thereof.

As previously mentioned, the piston 28 is mounted for reciprocation within the pumping chamber 27. In order to prevent leakage of oil or wicking material from the chamber 27 around the piston 28, a Hydro-line #N-661-11 rod seal 47 was mounted by means of screws 48 to the pump body 26. An inspection of FIG. 1 will reveal that the driven end of the piston 28 was bifurcated at 49 and mounted by means of a shoulder screw 51 to a drive link 52. In order to minimize wear and maintenance concern, the screw 51 was carried by an inner race of an MRC #201-FF ball bearing 53, the outer race of which was carried in a bore formed in the link 52. The link 52 is driven by the motor 31 (which for convenience was selected to be the same kind and type of motor as the motor 19). More specifically, the link 52 was provided with a large bore which accepts the outer race 54 of an MRC 190 213-FF ball bearing, the inner race 56 of which is pressed upon an eccentric 57. The eccentric 57 is readily revealed in FIG. 2 and the bearing 58 is held trapped between the outer diameter of the eccentric 57 and the inner diameter of the link 52 by means of a pair of bearing retainers 59, 61 which are fastened together by nuts and bolts that extend through the bearing retainers as well as the eccentric 57. To facilitate an understanding of the structure involved, the upper bearing retainer 59 has been removed from the structure illustrated in FIG. 2, but it will be understood that in practice, both the upper and lower bearing retainers are utilized. The eccentric 57 is keyed (as is readily apparent in both FIG. 1 and FIG. 2) and drivingly connected by means of a key with the shaft 62 of the motor 31. During operation, the motor 31 is actuated to thereby rotate the eccentric 57 about the axis of shaft 62. Since the link 52 is prevented from rotating because of its interconnection with the piston 49, the link 52 executes a reciprocating movement which causes the piston to be reciprocated back and forth within the pump chamber 27, all as will be understood by persons of ordinary skill in the art.

Any suitable mounting structure may be utilized in order to mount the motor 31 in the apparatus 11. However, for convenience, we mounted the motor to a spacer plate 63 and to an L-shaped mounting bracket 64. The mounting bracket 64 in turn was mounted by bolts to the pump mounting plate 23.

Figures 3, 4:
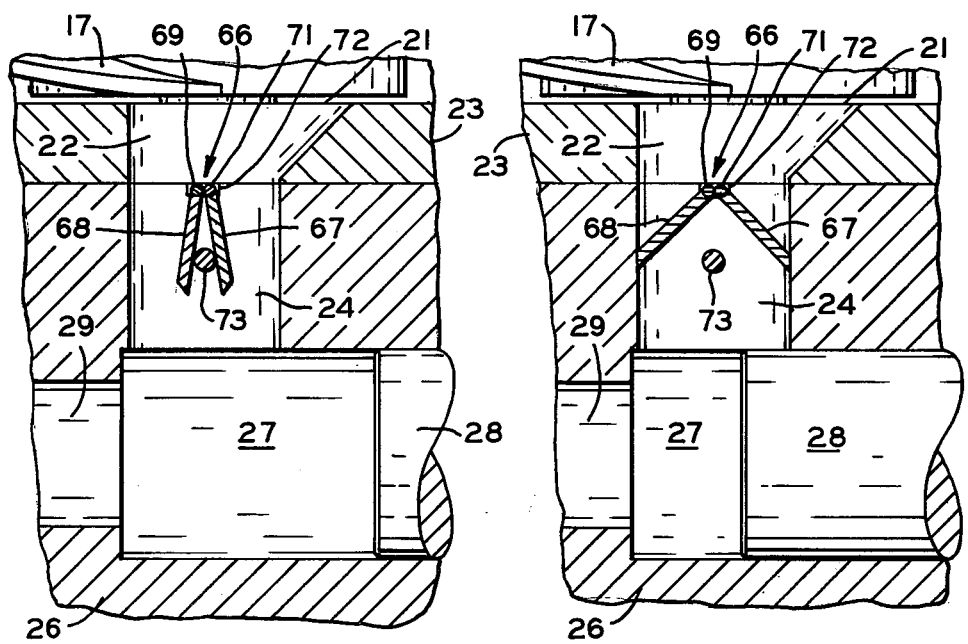
FIGS. 3 and 4 are enlarged fragmentary views of a portion of the structure shown in FIG. 4 illustrating the automatic operation of the double flapper valve utilized in the preferred embodiment.

With reference now to FIGS. 3 and 4, operation of the apparatus 11 will be described in somewhat more detail. FIG. 3 illustrates the piston 28 in a position that it would be in during the intake of material into the pump chamber 27. During this time, the passive valve means disposed within the inlet throat 24 is open and permits material to flow downwardly from the hopper into the pump chamber. However, even though the auger within the hopper continues to urge material downwardly past the valve means, as the piston 28 begins to move to the left as viewed in FIG. 3, sufficient pressure is applied to the material within the pump chamber and within the throat 24 to establish a positive pressure with respect to the pressure of the material being urged through the outlet 21 into the inlet opening 22. This pressure differential tends to cause a reverse flow of the material being handled with the result that the passive valve means closes and prevents a reverse or back flow of the material toward the hopper. Accordingly, as the piston 28 continues to move to the left as viewed in FIG. 4, material in the pump chamber 27 is forced out of the outlet port 29. After the piston 28 has reached the end of its stroke (depicted for example in FIG. 1), the piston begins to move to the right within the chamber 27. As the piston 28 moves to the right, it tends to create a negative pressure within the chamber 27 relative to the pressure of the material being urged downwardly from the hopper. As a result, the passive valve means in the inlet throat 24 opens (as revealed in FIG. 3) and material once again flows downwardly into the expanding pump chamber 27.

A wide variety of structures may be used as the passive valve means. For example, conventional check valves or reed valves may be utilized. In an actual reduction to practice of the invention, however, we utilized a double flapper valve as illustrated at 66 in FIGS. 3 and 4. Although it should now be readily apparent from a simple review of FIGS. 3 and 4 how the double flapper valve 66 is constructed, it is noted that the double flapper valve actually is made up of a pair of flapper vanes 67, 68, each of which is brazed to a 3/32 inch diameter rod 69, 71. The two flapper assemblies then (that each comprise a vane and rod) are dropped into a slot 72 formed at the entrance of the throat 24 in the pump body 26. Extending across the throat 24 and threaded into the pump body itself is a spacer screw 73 which is provided to ensure that the opening along throat 24 and along the vanes 67, 68 are convergent in the desired direction of material flow. Thus, as any back flow tends to be induced, the material will tend to be caught on the backside of the vanes 67, 68 and force the vanes into the closed valve condition illustrated in FIG. 4.

It will be recalled that the auger 17 may be continuously driven. We have found that the auger, even when being continuously driven, does not adversely affect the material contained within the hopper 12. Moreover, the pressure exerted by the auger is insufficient to provide an adequate and consistent flow of material along the conduit 16. It is because of this, that an additional positive displacement pumping means (such as the piston and pumping chamber) is provided to ensure adequate material flow. It is also now noted that the apparatus described and disclosed herein may be utilized with either materials as described for example in the hereinabove Whitt patent or with the various materials that are marketed under the trade name "Permawick" and which presumably are described in various patents to Abel, some of which have been identified hereinabove.

It should now be apparent that new and improved processes and apparatus have been disclosed herein that meet the objects and advantageous features set out hereinabove. Moreover, it should be apparent that modifications as to precise configurations, contours, and precise steps of preferred methods or the order in which some of the steps are performed, may be made by those having ordinary skill in the art without departing from the spirit of the invention.

What we claim as new and desire to secure by Letters Patent of the United States is:

1. Apparatus for pumping compressible lubricant retaining and wicking material, said apparatus comprising: a supply hopper for accommodating wicking material, and having a mixing and feeding auger therein, and also having an outlet through which wicking material is movable under the influence of the auger; a first prime mover interconnected with the auger for driving the auger; two flow control vanes pivotally supported in the apparatus and located to control the flow of material with respect to the outlet of the supply hopper, said vanes being movable between opened and closed positions; means for maintaining a minimum spacing between said vanes when in the opened positions so that material tending to flow in a reverse direction past the vanes while the vanes are in the opened positions will cause the vanes to move to closed positions; said apparatus further comprising a piston pump in communication with the outlet of the supply hopper and having a discharge means, and a second prime mover drivingly connected with the pump for causing operation thereof; said pump being operative to pull material thereinto past the vanes while the auger is supplying material under pressure to the hopper outlet; and said pump further being operative to push material therefrom against the vanes and cause the vanes to close against material being continuously forced thereagainst by the auger, whereby material pushed from the pump is prevented from moving back into the hopper and is forced to flow through the pump discharge means.

* * * * *

UNITED STATES PATENT AND TRADEMARK OFFICE
CERTIFICATE OF CORRECTION

PATENT NO. : 4,457,670
DATED : July 3, 1984
INVENTOR(S) : James M. Tomson and Richard C. Bohde It is certified that error appears in the above—identified patent and that said Letters Patent is hereby corrected as shown below:

On the title Item [75] Inventors:

Co-Inventor's last name, change "Bohole" to --Bohde--.

Signed and Sealed this

Nineteenth Day of February 1985

[SEAL]

Attest:

DONALD J. QUIGG

Attesting Officer    Acting Commissioner of Patents and Trademarks